United States Patent [19]

Costa

[11] 3,860,179
[45] Jan. 14, 1975

[54] DRIP IRRIGATION
[76] Inventor: Erminio Natale Costa, La Valle, Hugenot, South Africa
[22] Filed: Feb. 1, 1972
[21] Appl. No.: 222,594

[30] Foreign Application Priority Data
Feb. 17, 1971  South Africa...................... 71/1025

[52] U.S. Cl. ................................ 239/542, 239/547
[51] Int. Cl. ............................................ B05b 15/00
[58] Field of Search ........... 239/145, 547, 542, 551, 239/553.3

[56] References Cited
UNITED STATES PATENTS
2,798,768  7/1957  Babin ................................. 239/145
3,036,783  5/1962  Hansen ........................... 239/547 X
3,361,359  1/1968  Chapin ................................ 239/145
3,672,571  6/1972  Goodricke ......................... 239/145

Primary Examiner—M. Henson Wood, Jr.
Assistant Examiner—John J. Love
Attorney, Agent, or Firm—Ladas, Parry, Von Gehr, Goldsmith & Deschamps

[57] ABSTRACT

A combined flow and discharge fitting for a continuous drip irrigation system comprises a flow conduit having at least one capillary tube at least partially embedded in the wall of the flow conduit.

A method of continuous drip irrigation includes the step of discharging water drop-wise from a flow conduit via a plurality of spaced capillary tubes, at least some of the capillary tubes having different effective lengths to compensate for differences in internal pressure in the conduit, and to permit turbulent flow rates to be used in the conduit.

11 Claims, 11 Drawing Figures

PATENTED JAN 14 1975 3,860,179

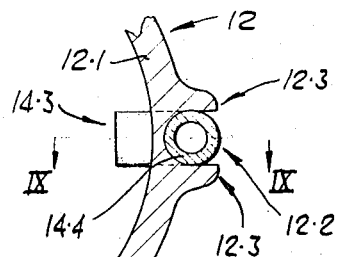
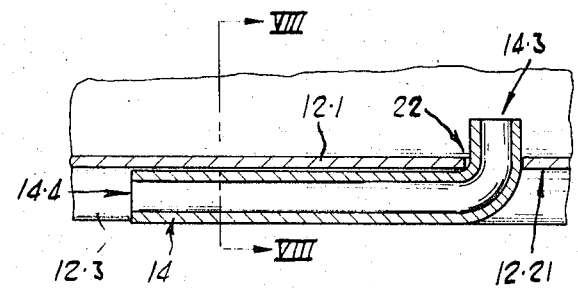
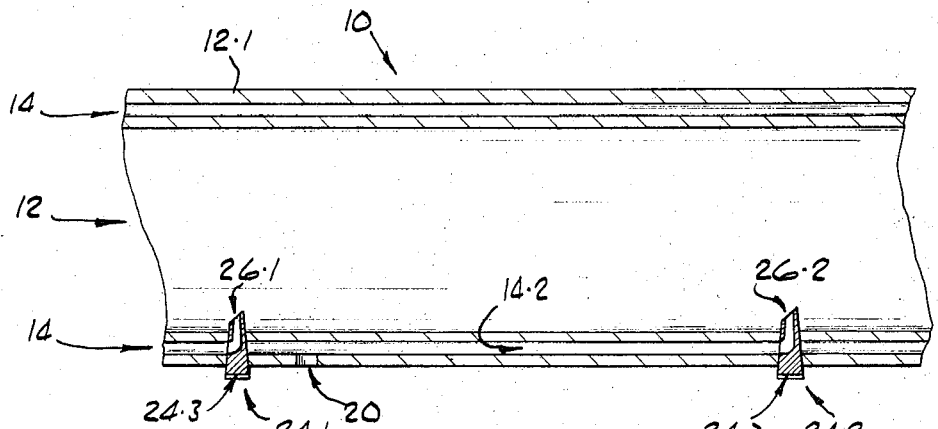
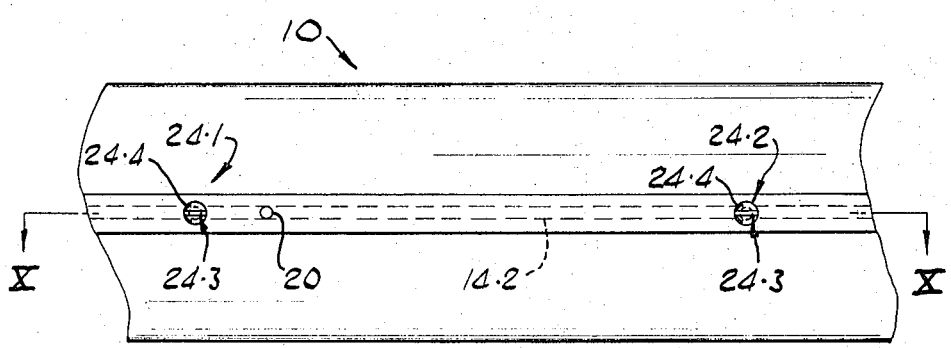

3,860,179

DRIP IRRIGATION

This invention relates to a method of continuous drip irrigation, and to means for carrying out a method of continuous drip irrigation.

According to the invention a method of continuous drip irrigation includes the step of discharging water dropwise from a flow conduit via a plurality of spaced capillary tubes, at least some of the capillary tubes having different effective lengths.

The method may include the step of varying the flow capacity of the tubes by varying the effective lengths thereof, substantially to compensate for differences in the internal pressure in the flow conduit. The method may also include the step of passing water at turbulent flow rates through the flow conduit.

Further according to the invention a combined flow and discharge fitting for a continuous drip irrigation system comprises a flow conduit having at least one capillary tube at least partially embedded in the wall of the flow conduit.

Still further according to the invention a combined flow and discharge fitting for a continuous drip irrigation system comprises a flow conduit having a plurality of circumferentially spaced capillary tubes.

Each capillary tube may be at least partially embedded in the wall of the flow conduit. The fitting may be formed by integrally extruding the tube or tubes and conduit. Each capillary tube may be held in a groove in the outer surface of the wall of the conduit. Each capillary tube may be held by an interference fit in the groove.

The invention extends thus to a flow conduit for a fitting as hereinbefore described, and having a groove in the outer surface of its wall for receiving each capillary tube.

Yet further according to the invention a method of preparing for use a fitting as hereinbefore described, includes the steps of forming a hole into the conduit via the bottom of at least one groove to receive its capillary tube in an interference fit, inserting an end of the tube into the hole, and cutting the tube at a desired distance from the hole to provide a discharge outlet.

According to another aspect of the invention a method of preparing for use a fitting as hereinbefore described includes the steps of forming a flow connection between at least one of the capillary tubes and the flow conduit, and of forming an external discharge opening in the capillary tube.

The flow connection may be formed by inserting a plug through the capillary tube so that it extends into the flow conduit, the plug having a passage to place the flow conduit in communication with the capillary tube. The method may include the further step of isolating a desired length of the capillary tube, the flow connection and discharge opening being formed in the isolated length of the capillary tube. The desired length may be isolated by punshing holes in the capillary tube and occluding them; the flow connection may be formed by punching a hole through the capillary tube and into the flow conduit and plugging the opening in the external wall of the capillary tube; and the discharge opening may be formed by punching a hole in the external wall of the capillary tube.

According to yet another aspect of the invention there is provided a plug for preparing for use a fitting as hereinbefore described, the plug having an elongated body portion and being tapered to be inserted through one of the capillary tubes to extend into the flow conduit, the plug having a passage to place the flow conduit in communication with the tube when the plug is in position in the tube.

According to still another aspect of the invention a method of preparing a flow conduit for use in a drip irrigation system, includes the step of providing capillary tube outlets from the flow conduit at desired intervals, and of adjusting the relative effective lengths of the capillary tubes to provide a substantially equal desired rate of discharge from each of the capillary tubes.

The effective lengths may be adjusted to give a substantially equal rate of discharge from each tube when water passes at turbulent flow rates through the conduit. The effective lengths may be adjusted to compensate for local differences in internal pressure in the flow conduit. When the flow conduit has at least one capillary tube extending along its length, the capillary tube discharge openings being provided by isolating desired lengths of the capillary tube, the method may include the steps of forming a flow connection between each length and the flow conduit, and of providing a discharge opening from each length.

The invention will now be described, by way of example, with reference to the accompanying drawings, in which:

FIG. 8 shows in detail a part sectional elevation of the assembled fitting of FIG. 7, taken along line VIII—VIII of FIG. 9;

FIG. 9 shows a part sectional elevation of the detail of FIG. 8, taken alone line IX—IX of FIG. 8;

FIG. 10 shows another longitudinal axial sectional plan view, taken along line X — X in FIG. 11, of yet another embodiment of a combined flow and discharge fitting according to the invention; and FIG. 11 shows a side elevation of the fitting of FIG. 10.

Figure 1:
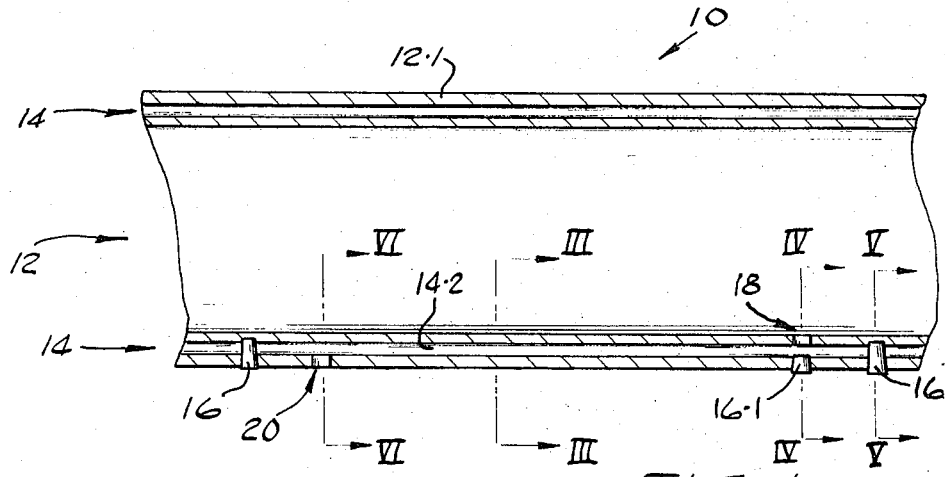
FIG. 1 shows a longitudinal axial sectional plan view, taken along line I—I in FIG. 2, of a combined flow and discharge fitting according to the invention.
Figure 2:
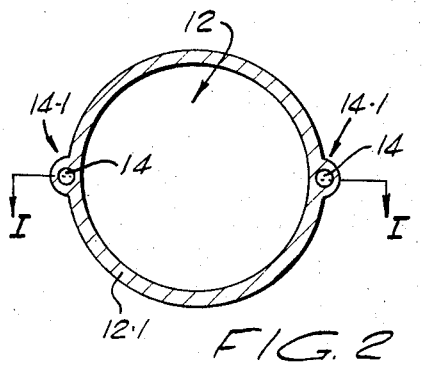
FIG. 2 shows an end elevation of the fitting of FIG. 1.
Figure 3:
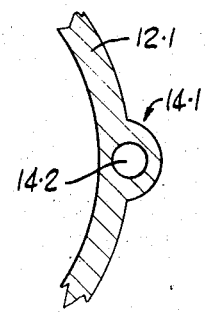
FIG. 3 shows in detail a part sectional elevation taken along line III—III of FIG. 1.

Referring initially to FIGS. 1 and 2, reference numeral 10 designates generally a combined flow and discharge fitting according to the invention. The discharge fitting comprises a flow conduit 12, and a pair of diametrically opposed capillary tubes 14 integrally formed in the wall 12.1 of the flow conduit 12. The outlines of the capillary tubes 14 are apparent as at 14.1 in the wall 12.1 of the flow conduit 12. The positions of the capillary tubes 14 in the wall 12.1 of the flow conduit 12 can thus be indentified. The flow or longitudinal axes of the flow conduit 12 and capillary tubes 14 are parallel. The fitting 10 is made of flexible plastics material, and the word "parallel" is used to indicate that the distance between the longitudinal axes of the conduit 12 and tubes 14 are substantially constant.

Reference is now made to FIG. 1 and FIGS. 3 to 6, where the fitting is shown prepared for use. Like reference numerals refer to like parts unless otherwise specified. Reference numeral 14.2 designates a desired length of the capillary tube 14 which is isolated by two plugs 16. The plugs 16 are inserted into holes punched through the outer wall of the capillary tube 14, and into, but not through, its inner wall. A plug 16 is shown in detail in FIG. 5.

Figure 4:
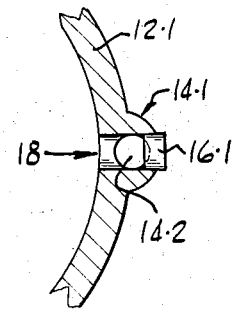
FIG. 4 shows in detail a part sectional elevation taken along line IV—IV of FIG. 1.

Referring now particularly to FIGS. 1 and 4, reference numeral 18 designates a flow connection between the isolated portion 14.2 of the capillary tube 14, and the flow conduit 12. The flow connection is formed by a holes punched through both the outer and inner walls of the capillary tube and into the flow conduit. The outer wall of the capillary tube is occluded by a plug 16.1, and the hole in the inner wall of the capillary tube forms the flow connection 18. The flow connection 18 is situated adjacent one of the plugs 16.

Figure 6:
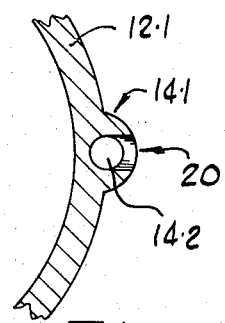
FIG. 6 shows in detail a part sectional elevation taken along line VI—VI of FIG. 1.

Referring now in particular to FIGS. 1 and 6, reference numeral 20 designates a discharge opening in the isolated portion 14.2 of the capillary tube 14. The discharge opening 20 is formed by punching a hole in the outer wall of the capillary tube adjacent the second plug 16, and at the opposite end of the isolated portion 14.2 from the flow connection.

Figure 7:
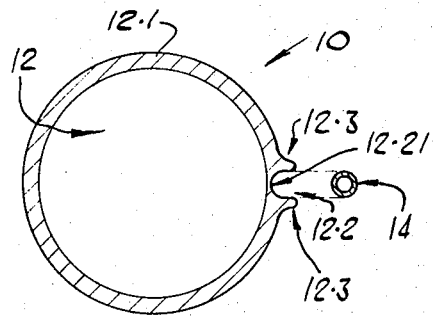
FIG. 7 shows an exploded end elevation of another embodiment of an combined flow discharge fitting according to the invention.
Figure 5:
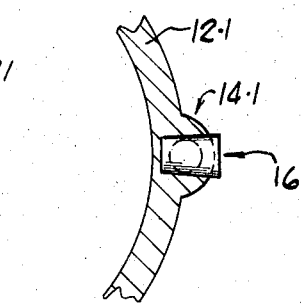
FIG. 5 shows in detail a part sectional elevation taken along line V—V of FIG. 1.

FIGS. 7, 8 and 9 show another embodiment of a combined flow and discharge fitting according to the invention. Like reference numerals refer to like parts.

The fitting comprises, in combination, a flow conduit 12 and a capillary tube 14. The flow conduit 12 has a groove 12.2 in the outer surface of its wall 12.1, the groove 12.2 being defined by two lips 12.3. The capillary tube 14 is held in the assembled fitting by an interference fit in the groove 12.2. (This is most clearly illustrated in FIG. 8).

It will be understood that the embodiment of the fitting shown in FIGS. 7, 8 and 9 can be prepared for use in the same manner as the fitting shown in FIGS. 1 to 6. The interference fit between the capillary tube 14 and the groove 12.2 is sufficient to prevent leakage between the capillary tube and the flow conduit (in a position equivalent to 18 shown in FIGS. 1 and 4).

In FIGS. 8 and 9 the fitting is shown prpeared for use in an alternative manner. In FIGS. 8 and 9, an end 14.3 of the capillary tube 14 is shown inserted through a hole 22 punched in the bottom 12.21 of the groove 12.2. The end 14.3 of the capillary tube forms a connection between the capillary tube and the flow conduit, and the end 14.3 of the capillary tube is held by an interference fit, (with no leakage) in hole 22. The capillary tube 14 is cut, as at 14.4, at a desired length from the hole 22. The end 14.4 of the capillary tube 14 thus forms a discharge opening for the capillary tube.

In FIGS. 10 and 11, another embodiment of the fitting of FIG. 1 is shown prepared for use in a yet further manner, with like reference numerals again referring to like parts. A desired portion 14.2 of the capillary tube is isolated by two plugs 24.1, 24.2 inserted into holes punched through the outer and inner walls of the capillary tube 14 and into the flow conduit 12. A discharge opening 20 is punched or cut in the outer wall of the isolated portion 14.2 of the capillary tube, and adjacent the plug 24.1.

The plugs 24.1, 24.2 respectively have flow passages 26.1, 26.2, shown connecting the flow conduit 12 to the capillary tube 14. The flow passage 26.2 thus forms a flow connection between the flow conduit 12 and the isolated portion 14.2 of the capillary tube. The plugs 24.1, 24.2 each have a groove 24.3 on their bases or outer surfaces and indicating means in the form of an arrow-head 24.4 indicating the positions of the outlets of the flow passage 26.1, 26.2 which correspond to the capillary tubes 14. Thus a screw-driver can be used to locate the plugs in their correct attitudes to form the required flow connection.

The embodiment of FIGS. 7, 8 and 9 can be prepared for use in the same manner as the embodiment of FIGS. 10 and 11.

If reference is made in particular to FIG. 10, it will be noted that the plugs 24.1, 24.2 are shown held frictionally in position in the tube 14 and conduit 12. Furthermore, it will be noted that the plugs 24.1, 24.2, radially inwardly relative to the conduit 12 from the tube 14 have a transverse cross-sectional or diametrical dimension as expressed by their diameters, which is not more than about double the diametrical dimension or diameter of the passages 26.1, 26.2. The plugs 24.1, 24.2 taper continuously and smoothly along their whole lengths from their ends to their inner ends. The passages 26.1, 26.2 similarly taper inwardly towards the interior of the conduit 12 from where they open into the capillary tube 14, to the inner ends of the plugs 24.1, 24.2, where they open in to the flow conduit 14. The passages 26.1, 26.2, have roughly the same diameter as the capillary tube 14 where they open out of the sides of the plugs 24.1, 24.2 into said capillary tube, and taper towards the inner ends of the plugs, so that the inner ends of the plugs and the passages have cross-sectional flow areas which are less than that of the capillary tube 14. The passages 26.1, 26.2 are substantially circular in transverse cross-section and have minimum diameters at the inner ends of the plugs.

If particular reference is now made to FIGS. 2 to 6, it will be noted that the thickness of the wall of the capillary tube 14 where it projects out of the wall of the flow conduit 12, is substantially constant in a direction measured radial relative to the capillary tube. The diameter of the capillary tube is substantially the same as the thickness of the wall of the flow conduit 12 remote from the capillary tube 14; and the thickness of material on opposite sides of the capillary tube 14, between the capillary tube and the interior of the conduit on the one hand and the exterior of the flow conduit on the other hand, is about half the thickness of the wall of the flow conduit 12 elsewhere.

It will be apparent that the isolated portion 14.2 of the capillary tube 14 shown in FIGS. 1 to 6, 10 and 11, and the cut portion of the capillary tube shown in FIGS. 7 to 9, form restrictive discharge nozzles. The effective length of the capillary tube forming the discharge nozzle is the distance between the flow connection between the capillary tube and the flow conduit 12, and the discharge opening of the capillary tube. By varying this effective length, the flow capacity (or inversely, the flow resistance) of the restrictive discharge nozzles formed by the capillary tube can be varied. By varying the flow capacit of such discharge nozzles in a continuous drip irrigation system, substantially constant discharge rates at the respective nozzles can be obtained, thereby compensating for varying internal liquid pressures in the flow conduits of the irrigation system at the positions of the respective discharge nozzles.

Continuous drip irrigation systems can thus be provided where even irrigation can be obtained, with varying internal pressures at various points in the systems. Pressures may be measured or calculated at various points in the systems, and the effective lengths of the capillary tubes, i.e. the flow capacities of the restrictive discharge nozzles, can be adjusted to desired discharge rates.

An advantage of the illustrated embodiments of the invention is thus that they provide a relatively simple means and method of compensating for differences in internal liquid pressure at various points in continuous drip irrigation systems caused for example by uneven terrain. As the systems become thus relatively insensitive to pressure variations, turbulent flow rates may be used in their flow conduits. This allows smaller gauge flow conduits to be used than in systems which are limited to laminar flow in their flow conduits.

A further advantage of the illustrated embodiments is that the combined flow and discharge fitting may be produced in any desired length. Standardization of the fittings of continuous drip irrigation systems is thus possible. The fitting may primarily be used as a flow conduit, and where discharge is required a restrictive discharge nozzle of desired flow capacity may be formed in the fitting as hereinbefore described. The fitting may thus form both a main flow conduit and the lateral conduit of a system. Alternatively, the fitting may be used only for the lateral conduits of a system.

Yet another advantage of the illustrated embodiment of the combined flow and discharge fitting, is that it is relatively inexpensive to make and robust. The robustness of the fitting and the ease with which it can be made by extrusion, whether the flow conduit and capillary tubes are extruded integrally (FIG. 2) or separately (FIG. 7), are due to each capillary tube being at least partially embedded in the wall of the flow conduit. At least partially embedding each tube in the wall of the conduit also permits the methods of preparing the fitting for use as hereinbefore described, easily to be applied to the fitting. The embedding of the tubes furthermore reduces the chance of damage thereto, when the fittings are laid across rough terrain.

I claim:

1. A combined flow and discharge fitting for a continuous drip irrigation system, comprising a flow conduit having at least one capillary tube at least partially embedded in the wall of the flow conduit and a plug having an elongated body portion inserted through one of the capillary tubes to extend into the flow conduit, said capillary tube having an external discharge opening on one side of the plug and the plug having a single passage at least in part of cross-sectional flow area less than the cross-sectional flow area of said capillary tube, which passage places the flow conduit in communication with said capillary tube on the side of the plug on which the external discharge opening is located, the plug isolating the capillary tube on the other side of the plug from the external discharge opening and from the flow conduit, the diametrical dimensions of the plug at all positions inwardly of the capillary tube being not more than about double the diametrical dimension of the passage, and the plug being held frictionally in position in the capillary tube and conduit.

2. A fitting as claimed in claim 1, in which the fitting is formed by integrally extruding the tube of tubes and conduit so that the capillary tube is partially embedded in the wall of the flow conduit, and in which the thickness of the wall of the capillary tube, where the wall of the capillary tube projects out of the wall of the flow conduit, measured in a direction radial relative to the capillary tube, is substantially constant.

3. A fitting as claimed in claim 1, in which each capillary tube is held in a groove in the outer surface of the wall of the conduit by an interference fit.

4. A plug for preparing for use a fitting as claimed in claim 1, the plug having an elongated body portion and being adapted to be inserted through one of the capillary tubes to extend into the flow conduit, the plug having a single passage to place the flow conduit in communication with the tube when the plug is in position in the tube the passage at all positions having a diametrical dimension which is not more than about half the diametrical dimension of the part of the plug along which the passage extends, and the passage having a cross-sectional flow area which is less than that of the capillary tube.

5. A fitting as claimed in claim 1, in which the plug tapers along its length from the capillary tube towards the interior of the flow conduit, so that the plug has a minimum diametrical dimension at its inner end, the passage opening out of the inner end of the plug into the conduit.

6. A fitting as claimed in claim 5, in which the passage tapers from the capillary tube towards the interior of the flow conduit so that the passage and plug have a minimum diameter at the inner end of the plug, the plug and passage both being of circular cross-section and being substantially coaxial.

7. A fitting as claimed in claim 2, in which the diameter of the capillary tube is substantially the same as the thickness of the wall of the flow conduit remote from the capillary tube, and the thickness of material on opposite sides of the capillary tube between the capillary tube and respectively the interior and exterior of the flow conduit, in a direction radial to the flow conduit, it about half the thickness in a radial direction elsewhere of the wall of the flow conduit.

8. A fitting as claimed in claim 1, which includes a plurality of said capillary tubes, circumferentially spaced, and in which each of the capillary tubes has a plurality of said plugs spaced along its length, each mutually adjacent pair of plugs in a capillary tube isolating therebetween a length of the capillary tube from the remainder of the capillary tube, said length being in communication with the flow conduit via one of the plugs and having an external discharge opening.

9. A combined flow and discharge fitting for a continuous drip irrigation system, comprising a flow conduit having at least one capillary tube partially embedded in the wall of the flow conduit, and a plug having an elongated body portion inserted through the capillary tube to extend into the flow conduit, the capillary tube having an external discharge opening on one side of the plug and the plug having a single passage which places the flow conduit in communication with the capillary tube on that side of the plug on which the external discharge opening is located, the plug isolating the capillary tube on the other side of the plug from the external discharge opening and from the flow conduit, the flow conduit and the capillary tube being in the form of an integral extrusion and the thickness of the wall of the capillary tube, where it projects out of the wall of the flow conduit, measured in a direction radial relative to the capillary tube, being substantially constant.

10. A fitting as claimed in claim 9, in which the passage of the plug at least in part has a cross-sectional flow area which is less than the cross-sectional flow area of the capillary tube.

11. A plug as claimed in claim 4, in which one end of the passage opens out of the side of the plug and the other end of the passage opens out of an end of the plug, the passage and plug tapering smoothly from the position where the passage opens out of the side of the plug to the said end of the plug.

* * * * *